United States Patent [19]

Podoloff

[11] Patent Number: 5,656,988
[45] Date of Patent: Aug. 12, 1997

[54] FORCE SENSORS WITH SEGMENTAL ELECTRODES

[75] Inventor: Robert Podoloff, Framingham, Mass.

[73] Assignee: Breed Technologies, Inc., Lakeland, Fla.

[21] Appl. No.: 505,740

[22] Filed: Jul. 24, 1995

[51] Int. Cl.$^6$ .............................. H01C 10/10; G01L 1/00
[52] U.S. Cl. ........................... 338/99; 73/862.68; 338/114
[58] Field of Search ........................... 240/5 R, 5 A, 240/512–517; 338/99–120, 22 R; 73/862.68; 178/18; 335/2; 361/748–751

[56] References Cited

U.S. PATENT DOCUMENTS

| | | | |
|---|---|---|---|
| 4,128,744 | 12/1978 | Seeger | 200/5 A |
| 4,694,126 | 9/1987 | Aiken, Jr. et al. | 200/5 A |
| 4,763,534 | 8/1988 | Hager | 73/862.68 |
| 4,793,193 | 12/1988 | Borgudd | 338/99 X |
| 4,810,992 | 3/1989 | Eventoff | 338/99 |
| 4,856,993 | 8/1989 | Maness et al. | 338/99 X |
| 5,086,652 | 2/1992 | Kropp | 73/862.38 X |
| 5,222,399 | 6/1993 | Kropp | 73/862.68 |
| 5,398,962 | 3/1995 | Kropp | 200/61.54 X |

*Primary Examiner*—J. R. Scott
*Attorney, Agent, or Firm*—Laff, Whitesel, Conte & Saret, Ltd.

[57] ABSTRACT

A force sensor employing a segmental electrode construction, with a portion of one of its pair of electrodes being printed on a first backing sheet and another portion of the one electrode being printed on a second sheet. When they are juxtaposed they form a continuous electrode. The other of the pair of electrodes is also formed on the first backing sheet and cooperates with the first electrode to indicate when a load is applied to a zone in which the pair of electrodes overlie one another.

12 Claims, 4 Drawing Sheets

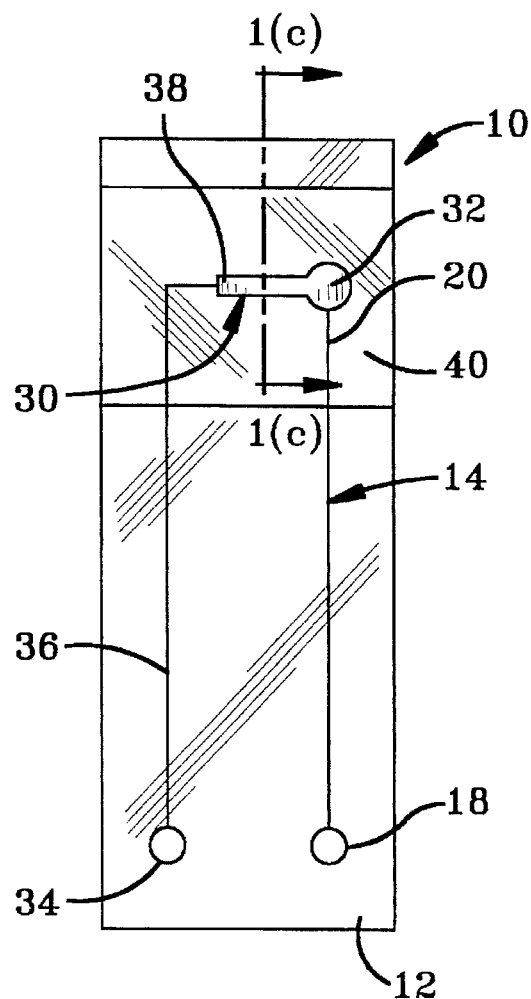
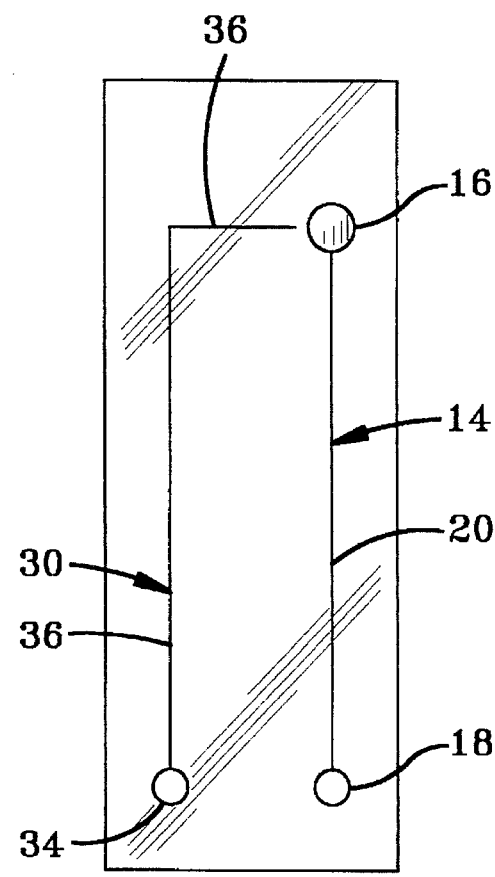
FIG-1
FIG-1(a)
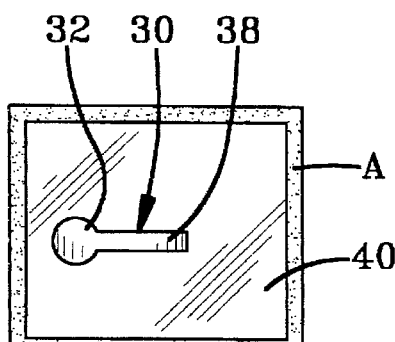
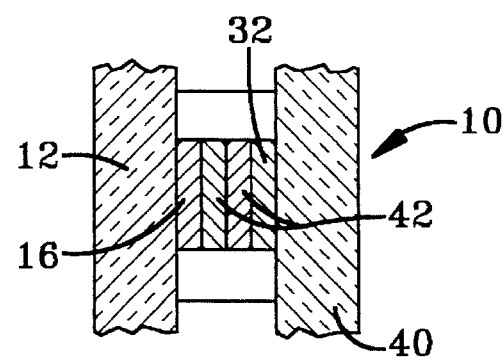
FIG-1(b)
FIG-1(c)

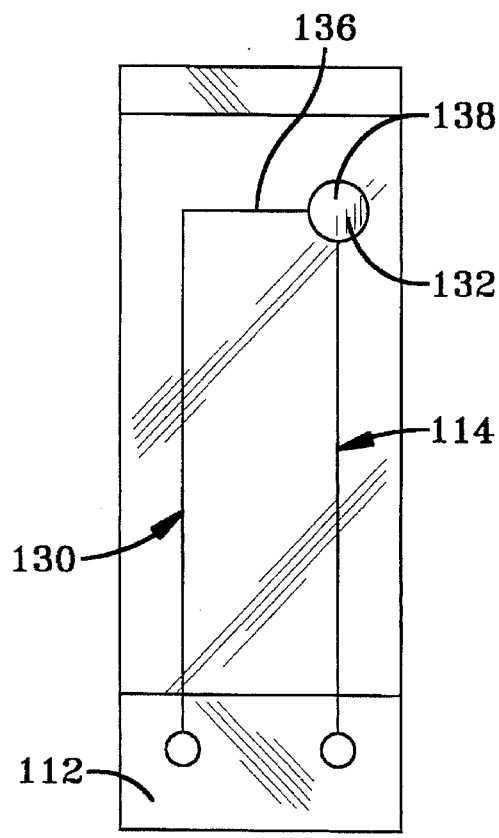 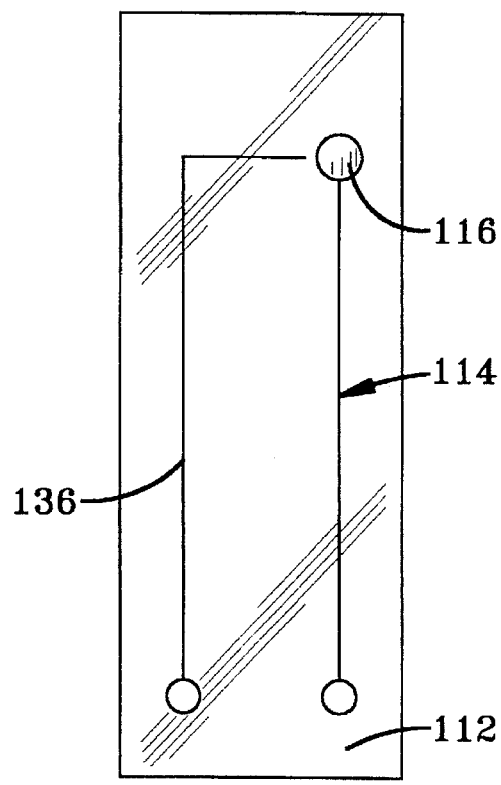
FIG-2  FIG-2(a)
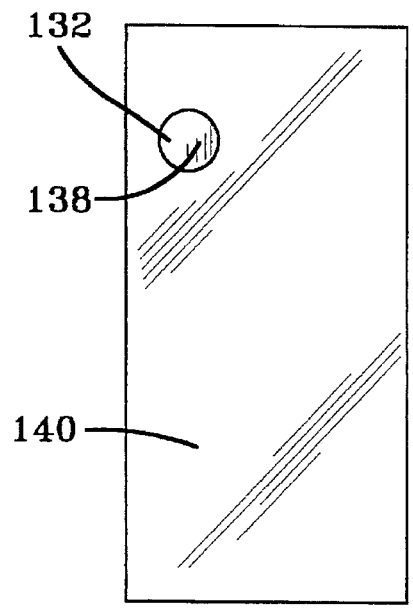 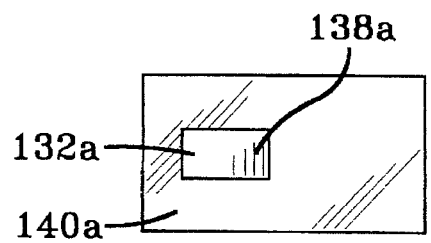
FIG-2(b)  FIG-2(c)

FORCE SENSORS WITH SEGMENTAL ELECTRODES

BACKGROUND OF THE INVENTION

Force responsive tactile or contact sensors of a variety of types are known. In one type, such a sensor comprises a pair of sheets having confronting electrodes with a pressure sensitive material, such as a pressure sensitive resistive material, between sensing zones thereof. Patents showing such constructions include Published UK Application No. GB 2115556A and U.S. Pat. No. 4,856,993. Another patent disclosing available force sensor constructions is U.S. Pat. No. 5,398,962.

All of these sensors typically utilize a pair of confronting electrodes in which one of the electrodes is on one sheet and the other is on the other sheet. When there are multiple sensing zones, an array of one set of electrodes is provided on one backing sheet and a second set of electrodes is provided on the other sheet. These sheets must be prepared, as by printing, and must then be aligned carefully, one with the other, to make certain that all of the pairs of sensing zones and sets of electrodes are properly aligned.

Furthermore, because of the manner in which these force sensors are made, typically by silk screening, it is expensive to set up screens and patterns. Each different sensor requires its own special set of screens to produce the desired force sensor product. Where it is desired to make a sensor which is universal to a variety of alternative constructions, but without rendering active all of the sensing sites, that is virtually impossible to accomplish in any practical sense.

Accordingly, it would be desirable to provide a force sensor construction in which universality to a variety of configurations of sensor arrays is possible, while limiting completed circuits to only selected circuits and selected electrodes. It would also be desirable to provide a multi-electrode sensor construction in which most of both sets of electrodes are disposed on one of the two confronting backing sheets, thereby to minimize alignment requirements.

SUMMARY OF THE INVENTION

An improved segmental electrode construction and an improved force sensor are provided in accordance with this invention. The force sensor which senses loads to be applied thereto comprises a first backing sheet, a first conductive electrode formed, as by printing, on the first sheet and defining a first sensing zone and a first contact zone, a second backing sheet means, a segmental second conductive electrode, the segmental second electrode comprising a second sensing zone and an associated bridging zone, a second contact zone and an intermediate zone. The second contact zone and at least a portion of the intermediate zone are formed on the first sheet, spaced from the first electrode, and the second sensing zone and associated bridging zone are formed, as by printing, on the second sheet means. Pressure sensitive resistive material is disposed on at least one of the first and second sensing zones. The backing sheet and backing sheet means are disposed with the sensing zones confronting and overlying each other, and with the bridging zone overlapping at least part of the intermediate zone on the first sheet.

In one form, there are at least two segmental second electrodes, each second electrode comprising a second sensing zone and an associated second bridging zone, a second contact zone and a second intermediate zone; and the first electrode comprises at least two sensing zones. The sheet and sheet means are disposed to provide at least two pairs of first and second sensing zones confronting and overlying each other, with associated bridging zones overlapping associated intermediate zones on the first sheet, and pressure sensitive resistive material is disposed between each pair of confronting first and second sensing zones.

In another form there are at least two first electrodes, each having a first sensing zone, and wherein the segmental second electrode comprises at least two sensing zones each having an associated bridging zone, a contact zone and at least two intermediate zones. The sheet and sheet means are disposed to provide at least two pairs of first and second sensing zones confronting and overlying each other with an associated bridging zone overlapping an associated intermediate zone on the first sheet, and pressure sensitive resistive material is disposed between each pair of confronting first and second sensing zones.

In yet another form there are at least two first electrodes, each having at least two sensing zones, and at least two segmental second electrodes, each second electrode comprising at least two sensing zones, each having an associated bridging zone, a contact zone and at least two intermediate zones. The sheet and sheet means are disposed to provide at least two pairs of first and second sensing zones confronting and overlying each other with associated bridging zones overlapping associated intermediate zones on the first sheet, and pressure sensitive resistive material disposed between each pair of confronting first and second sensing zones.

Further objects, features and advantages of the present invention will become apparent from the following description and drawings.

BRIEF DESCRIPTION OF THE DRAWINGS

FIG. 1 is a plan view of a force sensor of the present invention;

FIG. 1(a) is a plan view of one sheet of the force sensor of FIG. 1;

FIG. 1(b) is a plan view of the second sheet of the force sensor of FIG. 1 before it is turned over to confront the complementary sensor portion of FIG. 1(a);

FIG. 1(c) is a cross-sectional view taken substantially along line 1(c)—1(c) of FIG. 1;

FIG. 2 is a plan view of a further force sensor of the present invention;

FIG. 2(a) is a plan view of one sheet of the force sensor of FIG. 2;

FIG. 2(b) is a plan view of the second sheet of the force sensor of FIG. 2 before it is turned over to confront the complementary force sensor portion of FIG. 2(a);

FIG. 2(c) is a plan view of an alternative second sheet of the force sensor of FIG. 2;

DETAILED DESCRIPTION OF THE INVENTION

Figure 3A:
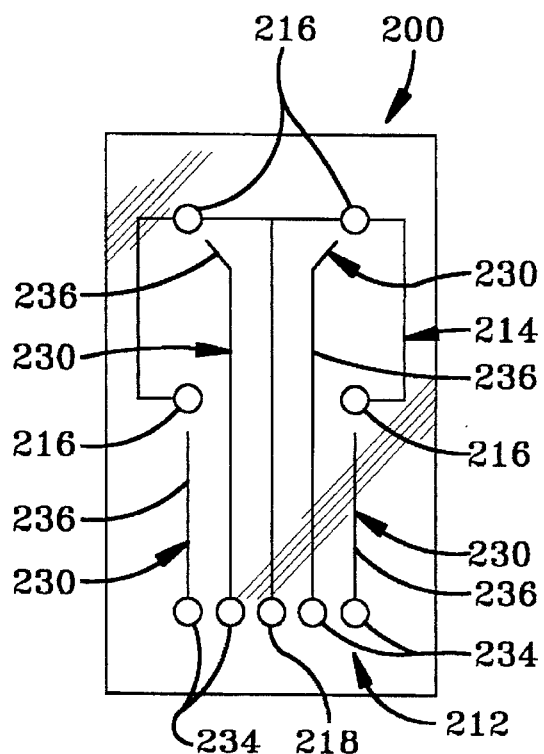
FIGS. 3(a) and 3(b) are plan views of the first and second sheets of yet another force sensor of the present invention, prior to the second sheet of FIG. 3(b) being turned over to confront the complementary sensor portion of FIG. 3(a)

Referring first to FIGS. 1 to 1(c), a force sensor 10 in accordance with the present invention comprises a first thin insulating backing sheet 12, as of a very thin flexible polyester film, and a first conductive electrode 14, as of a conductive silver ink, coated thereon, as by screen printing. The first electrode includes a first sensing zone 16, a first contact zone 18 and a connecting zone 20.

A segmental second conductive electrode 30 is provided. The second electrode includes a second contact zone 34 and an intermediate zone 36, all also formed, as by screen printing with a conductive silver ink, on the first backing sheet 12. FIG. 1(b) shows the described electrode elements 34, 36 as imprinted on the first sheet 12.

As will be apparent, the segmental second electrode 30 also includes a sensing zone 32 with an associated bridging zone 38. These are provided, as by screen printing, on a second thin, flexible backing sheet means 40, such as of polyester, and are adapted, respectively, to overlie the first sensing zone 16 and a portion of the intermediate zone 36 of the second electrode 30, and to bridge the gap between the intermediate zone 36 and the second sensing zone 32. It will be apparent that when the first sheet 12 and sheet means 40 of FIGS. 1(a) and 1(b) respectively, are disposed with the sensing zones 16, 32 overlying each other and in a confronting array, as shown in FIG. 1, that the segmental second electrode 30 is continuous between its sensing zone and contact zone.

As is also common in conventional force sensors, a pressure sensitive resistive material is interposed between the confronting sensing zones. In the embodiment of Figs. 1–1(c) the pressure sensitive material is screen printed in patterns 42 over each of the sensing zones 16, 32. The pressure sensitive material may be a conventional semiconducting carbon/molybdenum disulfide material in a suitable binder, such as an acrylic binder. The sensor 10 operates, as will be apparent from the above-identified patent literature, by loading the sensor in the sensing zones. When a load is applied, the resistance of the pressure sensitive material 42 decreases, and current then can flow between the sensing zones 16, 32 providing, by using art recognized means connected with contacts 18, 34, an indication of the change in resistance (conductivity), hence an indication of the applied load.

In the embodiment of FIGS. 1–1(c), the second sheet means 40 can be of a size much smaller than sheet 12, and may be viewed as a patch. Desirably, an adhesive A is disposed, as in a perimetric pattern, on the patch so that the patch will be secured and maintained in position upon assembly with the sheet 12. For protective purposes, a blank sheet may overlie exposed portions of the electrodes on the sheet 12.

Finally, as is known, the backing sheets and layers of materials, including the electrodes, semiconductor and adhesive, may be the range of only several thousandths inch or less to provide very thin flexible force sensors. Thicker backings may be employed as well.

The embodiment of FIGS. 2 to 2(b) is similar to the embodiment of FIGS. 1 to 1(b), except that the bridging zone 138 is an apparent part of the sensing zone 132. It will be seen that the sheet means 140 bears a second electrode portion which is proportioned to overlie the underlying sensing zone 116 of electrode 114 and to bridge, via bridging zone 138, the gap in the second electrode between the sensing zone 132 and the intermediate portion 136 which is disposed on sheet 112. Further, as shown by FIG. 2(c), the sensing zone 132A and bridging zone 138A can assume a combined rectangular shape, rather than the circular shape of FIG. 2(b), as long as the dimensions and expanses of the zones are sufficient to satisfy the sensing and bridging requirements of the sensor. Of course, if the sensing zones 132, 132A are provided with a pressure sensitive resistive material thereon (in addition to or instead of the application of that material to sensing zone 116), the bridging portion 138, 138A overlying the intermediate zone 136 on the first sheet should be free of the pressure sensitive material, thereby to provide electrical continuity.

Finally, as shown, the sheet means 140, 140A of FIGS. 2(b) and 2(c) may be of a small size as shown in FIG. 2(c), or may both bear the second electrode segments and protectively cover other electrode portions imprinted on sheet 112 as shown by FIG. 2(b).

Figure 3B:
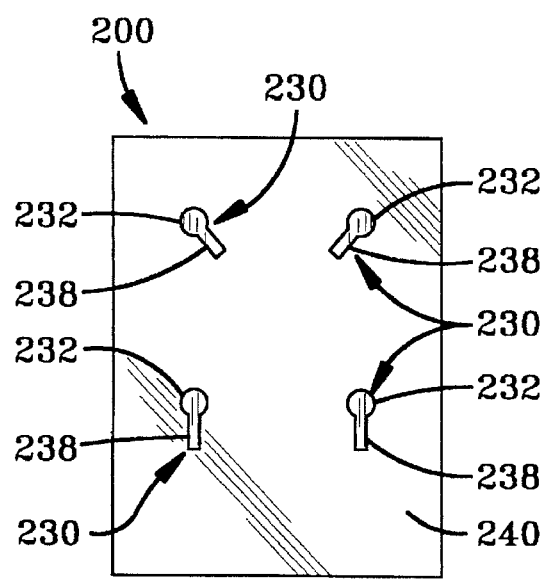

FIGS. 3(a) and 3(b) illustrate yet another embodiment of the present invention. In this case the force sensor 200 comprises a first thin insulating backing sheet 212 with a compound, silk screened first conductive electrode 214 thereon. The first electrode includes a contact zone 218, a plurality of first sensing zones 216 and connecting zones between the contact and sensing zones.

A plurality of segmental second electrodes 230 (in this case four) are provided. Each second electrode 230 comprises a contact zone 234 and an intermediate zone 236 formed, as of a screen printed conductive silver ink, on the first backing sheet 212. FIG. 3(a) shows the contact zones 234 and intermediate zones 236 on the first sheet 212. The remainder of the second electrodes 230 comprise sensing zones 232 and bridging zones 238 associated therewith, all of which are also of a conductive silver ink. These are disposed on a second backing sheet 240. A sensing zone 232 and bridging zone 238 may be provided on a single sheet means 240 for each of the complementary sensing zones 216, or they may be provided on separate sheets, or they may be provided for less than all of the complementary sensing zones 216.

Those sensing zones 232 and associated bridging zones 238 which are present are positioned and adapted to overlie and confront the complementary first sensing zones 216 and portions of the intermediate zones 236 of the second electrodes, thereby to bridge the gaps between the intermediate zones 236 and the second sensing zones 232. In that manner, when the sheet 212 and sheet means 240 are disposed with the pairs of sensing zones 216, 232 in an overlapping confronting relationship, the segmental second electrodes will be continuous, respectively, between their sensing zones 232 and associated contact zones 234.

Of course, like the force sensors of the other embodiments, a pressure sensitive resistive material is interposed between the pairs of sensing zones 216, 232. This material may be printed, as by screen printing, in patterns of material (as in the manner described relative to material 42) similar in size and shape to the sizes and shapes of the sensing zones 212, 232 and lies therebetween for the purposes and to the ends described above.

To hold the elements of the sensor 200 together as a force sensor, a perimetric body or other configuration of adhesive may be applied to one or both of the sheets so that when the sheet means bearing sensing zones 232 is positioned with the pairs of sensing zones in their overlying relationships, they will be retained in that relationship.

Figure 4A:
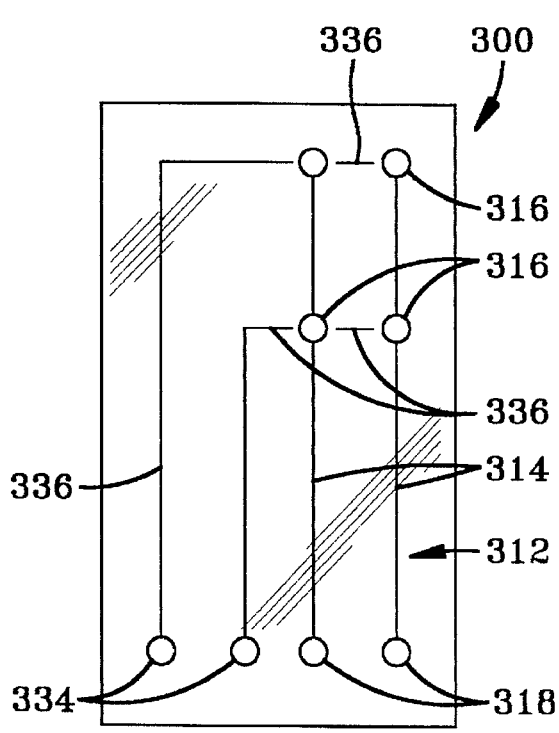
FIGS. 4(a) and 4(b) are plan views of the first and second sheets of a further force sensor of the present invention prior to the second sheet of FIG. 4(b) being turned over to confront the complementary sensor portion of FIG. 4(a)
Figure 4B:
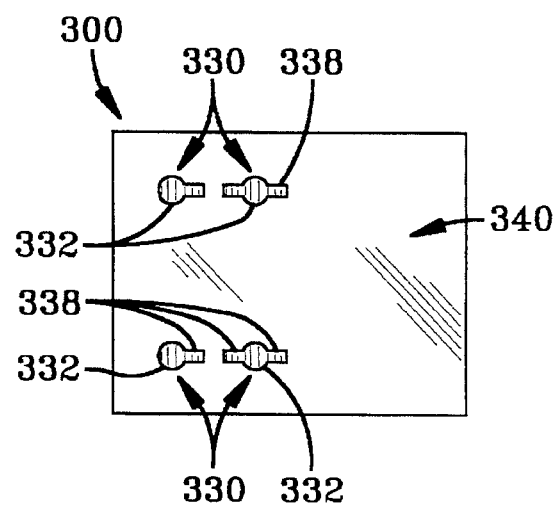

FIGS. 4(a) and 4(b) show still another embodiment of the present invention. Force sensor 300 comprises a first thin insulating backing sheet 312 with a plurality of first electrodes 314 of a screen printed conductive ink thereon. Each first electrode includes a contact zone 318, first sensing zones 316 and connecting zones between the contact and the sensing zones.

A plurality of segmental second electrodes 330 (in this case two electrodes) are provided. Each second electrode 330 comprises a contact zone 334 and a segmental intermediate zone 336 formed, as of a screen printed conductive silver ink, on the first backing sheet 312. FIG. 4(a) shows the contact zones 334 and intermediate zones 336 on the first sheet 312. The remainder of the second electrodes 330 comprises sensing zones 332 and bridging zones 338 associated therewith, also of a conductive silver ink. These are disposed on a second backing sheet 340. A sensing zone 332 and bridging zone 338 may be provided for each of the complementary sensing zones 316 on a single sheet means 340, or they may be provided on separate sheets, or they may be provided for less than all of the complementary sensing zones 316.

Those sensing and bridging zones which are present are positioned and adapted to overlie the complementary first sensing zones 316 and portions of the intermediate zones 336 of the second electrodes, thereby to bridge the gaps between the intermediate zones 336 and the second sensing zones 332. In that manner, when the sheet 312 and sheet means 340 are disposed with the pairs of sensing zones 316, 332 in an overlapping confronting relationship, the segmental second electrodes will be continuous, respectively, between their sensing zones 332 and the associated contact zones 334.

Like the force sensors of the other embodiments, a pressure sensitive resistive material is interposed between the pairs of sensing zones 316, 332. This material may be printed, as by screen printing, in patterns of material (as in the manner described relative to material 42) similar in size and shape to the sizes and shapes of the sensing zones and lies therebetween for the purposes and to the ends described above. To hold the elements of the force sensor 300 together, a perimetric body or other configuration of adhesive may be applied to one or both of the sheets so that when the sheet means bearing sensing zones 316, 332 are positioned with the pairs of sensing zones in their overlying relationships, they will be retained in that relationship.

Figure 5A:
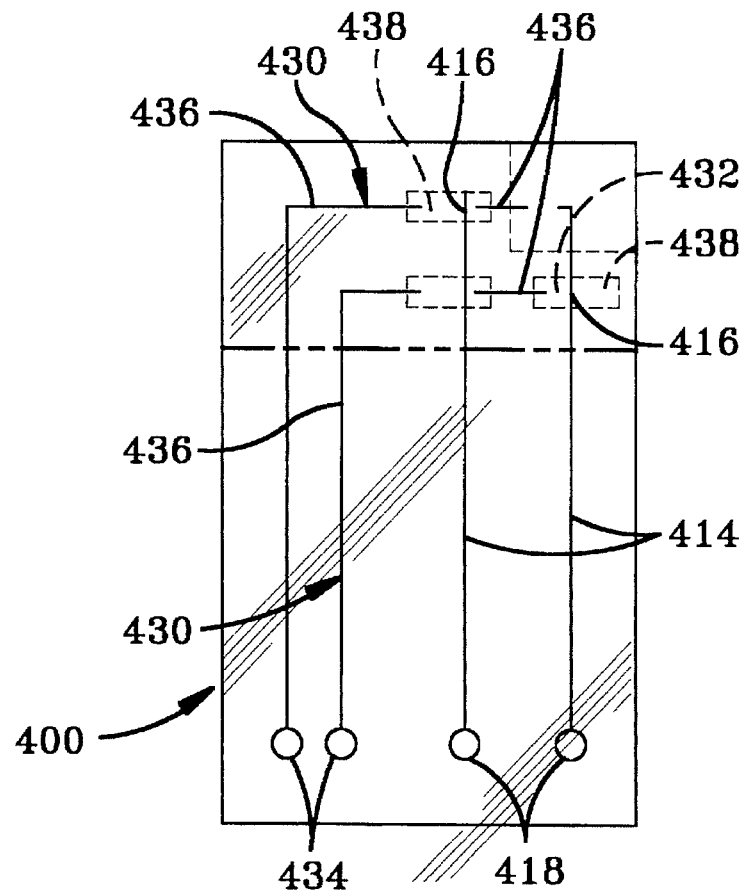
FIGS. 5(a) and 5(b) are first and second sheet portions of still another force sensor of the present invention and showing further features of the present invention.
Figure 5B:
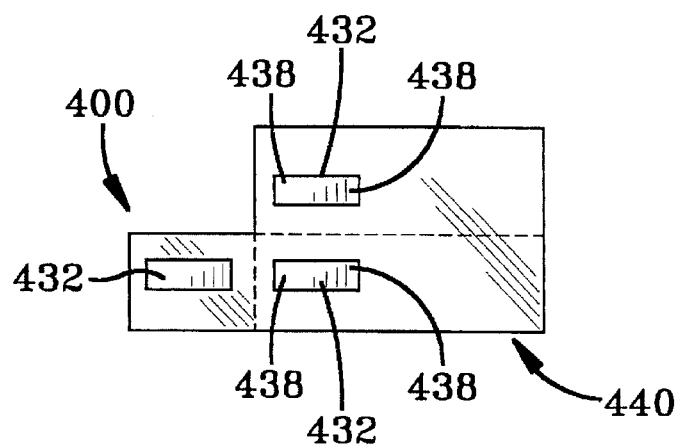

Another embodiment and further features of the present invention are illustrated in FIGS. 5(a) and 5(b). Force sensor 400 comprises a first thin insulating backing sheet 412 with a plurality of first electrodes 414 of a screen printed conductive ink, such as a silver-based ink, thereon. Each first electrode 414 includes a contact zone 418, first sensing zones 416 and connecting zones between the contact and sensing zones.

A plurality of segmental second electrodes 430 (in this case two) are provided. Each second electrode 430 comprises a contact zone 434 and a segmental intermediate zone 436 (comprising two intermediate zone portions) formed, as of a screen printed conductive silver ink, on the first backing sheet 412. FIG. 5(a) shows the contact zones 434 and intermediate zones 436 on the first sheet. The remainder of the segmental second electrodes 430 comprise sensing zones 432 and bridging zones 438 associated therewith, also of a conductive ink such as a conductive silver ink. These are disposed on a second backing sheet 440. A sensing zone 432 and bridging zone 438 may be provided for each of the complementary sensing zones 416 (or, as shown in FIG. 5(b), for less than all of the sensing zones 416), on a single sheet means 440, or they may be provided on separate sheets, to be applied separately.

Those sensing zones 432 which are present are positioned and adapted to overlie and confront the complementary first sensing zones 416 and portions of the intermediate zones 436 of the second electrodes, thereby to bridge the gaps between the intermediate zones 436 and the second sensing zones 432. As seen in FIG. 5(a) in dotted line, the assembly of FIG. 5(b) has been turned over and disposed on sheet 412 and the second sensing zones 432 and bridging zones 438 have been juxtaposed thereon. In that manner, when the sheet 412 and sheet means 440 are disposed with the pairs of sensing zones 416, 432 in their overlapping confronting relationships, the segmental second electrodes will be continuous, respectively, between the sensing zones 432 and the associated contact zones 434.

Of course, like the contact sensors of the other embodiments, a pressure sensitive resistive material is interposed between the pairs of sensing zones 416, 432. This material may be printed, as by screen printing, in patterns of material (as in the manner described relative to material 42) similar in size and shape to the sizes and shapes of the underlying sensing zones and lies therebetween for the purposes described above. Again, to hold the elements of the sensor 400 together, a perimetric body or other configuration of adhesive may be applied to one or both of the sheets so that when the sheet means bearing sensing zones 432 is positioned with the pairs of sensing zones 416, 432 in their overlying relationships, they will be maintained and retained in that relationship.

It will also be apparent from FIGS. 5(a) and 5(b), that the sensing zones 416 need not be of any particular shape and may simply be any part of the electrodes 414. Similarly sensing zones 432 need not be circular, but may be of any dimension and shape which, with the sensing zone 416, will facilitate suitable recognition of the application of load in the load sensing zone. It will also be apparent from the drawings of the several embodiments that the bridging zones of the second electrodes may be indistinguishable in shape from their associated sensing zones and that their only requirement is that they be aligned with and bridge the gaps in the second electrodes. For that reason they are typically wider or enlarged to insure that they will overlie the intermediate zone of the second electrode with which they are to provide electrical continuity. Thus, at least one of the bridging zone and intermediate zone in the area in which they overlap is wider than the other to assure electrical continuity.

FIGS. 5(a) and 5(b) also show that less all of the sensing zones 416 may be used. As such it will be apparent that selections may be made of areas of a multipoint array that are of interest and that a single multipoint sensor may be arrayed in a variety of configurations and arrays of pairs of sensing zones simply by selectively juxtaposing sensing zones 432 and associated bridging zones 438 with a preformed first sheet employing the principles embodied in FIG. 5(a). In other words, contacts 434 will be active or inactive depending upon which pairs of sensing zones 416, 432 are provided by a superposed sensing zone 432 (with, of course, its associated bridging zone or zones 438).

From the foregoing, it will be apparent to those skilled in the art that modifications may be made without departing from the spirit and scope of the present invention. Accordingly, the invention is not intended to be limited except as may be made necessary by the appended claims.

What is claimed is:

1. A force sensor for sensing loads to be applied to said sensor, said force sensor comprising a first backing sheet, a first conductive electrode formed on said first sheet and defining a first sensing zone and a first contact zone, a second backing sheet, a segmental second conductive electrode, said second electrode comprising a second sensing zone and an associated bridging zone, a second contact zone and an intermediate zone, said second contact zone and at least a portion of said intermediate zone being formed on said first sheet and being spaced from said first electrode, and said second sensing zone and associated bridging zone being formed on said second sheet, pressure sensitive resistive material disposed on at least one of said first and second sensing zones, and said first backing sheet and second backing sheet being disposed with said sensing zones confronting and overlying each other, and with said bridging zone overlapping at least part of said intermediate zone on the first backing sheet.

2. A force sensor in accordance with claim 1, and wherein there are at least two segmental second electrodes, each said second electrode comprising a second sensing zone and an associated second bridging zone, a second contact zone and a second intermediate zone, and wherein said first electrode comprises at least two sensing zones, and wherein said first backing sheet and said second backing sheet are disposed to provide at least two pairs of first and second sensing zones confronting and overlying each other, and with each bridging zone overlapping at least part of an associated intermediate zone on said first backing sheet, and pressure sensitive resistive material disposed between each pair of confronting first and second sensing zones.

3. A force sensor in accordance with claim 1, and wherein there are at least two first electrodes, each having a first sensing zone, and wherein said segmental second electrode comprises at least two sensing zones each having an associated bridging zone, a contact zone and at least two intermediate zones, and wherein said first backing sheet and said second backing sheet are disposed to provide at least two pairs of first and second sensing zones confronting and overlying each other and with a bridging zone associated with each second sensing zone overlapping an associated intermediate zone on said first backing sheet, and pressure sensitive resistive material disposed between each pair of confronting first and second sensing zones.

4. A force sensor in accordance with claim 1, and wherein there are at least two first electrodes, each first electrode having at least two sensing zones, and at least two segmental second electrodes, each said second electrode comprising at least two sensing zones, each said second electrode also having an associated bridging zone, a contact zone and at least two intermediate zones, and wherein said first and second backing sheets are disposed to provide at least two pairs of first and second sensing zones confronting and overlying each other with bridging zones associated with each second sensing zone overlapping associated intermediate zones on said first sheet, and pressure sensitive resistive material disposed between each pair of confronting first and second sensing zones.

5. A force sensor in accordance with claim 1, and wherein said second backing sheet comprises a unitary sheet.

6. A force sensor in accordance with claim 1, and wherein said second backing sheet comprises a plurality of sheet members.

7. A force sensor in accordance with claim 1, and wherein one of said bridging zone and intermediate zone in the area of their overlap is wider than the other to assure electrical continuity.

8. A force sensor in accordance with claim 1, and wherein said electrodes are printed on said first backing sheet and said second backing sheet.

9. A segmental conductive electrode element comprising a first conductive electrode segment including a contact disposed on a first backing sheet and a second conductive electrode segment including a sensing element disposed on a second backing sheet, said first and second electrode segments defining a zone in which they lie in an aligned, partially overlapping and contacting array to provide a continuous conductive electrode element, one of said first and second elements being wider than the other in said zone.

10. A segmental conductive electrode element in accordance with claim 9, and further comprising means for maintaining said electrode elements in said overlapping and contacting array in said zone.

11. A segmental conductive electrode element in accordance with claim 10 and wherein said maintaining means is an adhesive.

12. A segmental conductive electrode element in accordance with claim 9 and wherein said first and second backing sheets are thin flexible sheets and said electrode segments are coated thereon.

* * * * *